United States Patent [19]

Dumas et al.

[11] Patent Number: 5,087,694

[45] Date of Patent: Feb. 11, 1992

[54] FLUORINATED GELATIN AND PROCESS FOR ITS PREPARATION

[75] Inventors: Sylviane Dumas; Georges Takerkart, both of Isle sur la Sorgue, France

[73] Assignee: Sanofi, Paris, France

[21] Appl. No.: 451,169

[22] Filed: Dec. 15, 1989

[30] Foreign Application Priority Data

Dec. 16, 1988 [FR] France ................... 8816673

[51] Int. Cl.$^5$ ............................................. C09H 7/00
[52] U.S. Cl. ........................... 530/354; 106/125; 106/135; 106/136; 430/621
[58] Field of Search ............. 530/354; 430/621; 106/125, 135, 106

[56] References Cited

U.S. PATENT DOCUMENTS 3,133,908  5/1964  Klevens .................. 530/354
3,149,974  9/1964  Claeys et al. ............ 430/621
3,186,847  6/1965  Willems et al. .......... 430/621
4,201,586  5/1980  Hori et al. ............... 430/621

FOREIGN PATENT DOCUMENTS 1101291   1/1968  United Kingdom .
1604741  12/1981  United Kingdom .

*Primary Examiner*—Howard E. Schain
*Attorney, Agent, or Firm*—Foley & Lardner

[57] ABSTRACT

The present invention relates to modified gelatin containing polyfluorinated substituents grafted on to the protein chain.

It further relates to the process for the preparation of this modified gelatin, which consists in reacting a polyfluorinated derivative containing a group capable of reacting with the OH or NH$_2$ groups of the gelatin in aqueous solution.

Application: photographic film preparations.

13 Claims, No Drawings

FLUORINATED GELATIN AND PROCESS FOR ITS PREPARATION

The present invention relates to gelatins modified by the attachment of polyfluorinated groups to the protein chain, to a process for the preparation of these gelatins and to their applications, especially in the field of photography.

It is known that polyfluorinated derivatives, whether derived from hydrocarbons or compounds carrying functional groups, are hydrophobic and oleophobic, which is why their uses are increasing despite their high cost price.

Thus they may be used as surface-active agents of particular value when they are derived from aliphatic hydrocarbons having from 4 to 12 carbon atoms and when one of the ends of the molecule is polyfluorinated they are used as wetting agents and emulsifiers and as additives in waxes and paints, or in coatings for textiles, paper and leather.

They are also introduced into photographic films, for example as antistatic agents to prevent the formation of specks due to the electrical charges produced during the manufacture or treatment of the films, or else for their non-stick and slip effect to limit the phenomenon whereby coatings containing a hydrophilic binder, such as gelatin, stick in a moist environment; these applications are described in particular in U.S. Pat. No. 4,201,586 and British patent 1 604 741.

It has now been found that it is possible to graft polyfluorinated groups on to the protein chains of gelatin and that the modified gelatin obtained has considerable advantages over the previously known mixture of gelatin and fluorinated product. Firstly, as the polyfluorinated chain is grafted on to the molecule by covalent bonding, the difficulties presented by the homogenization of mixtures of gelatin and fluorinated product disappear and the composition obtained is stable with time, the low-molecular fluorinated product no longer being able to migrate between the protein chains.

Secondly, the modified gelatin generally has a greater viscosity than the starting gelatin without there being any appreciable modification of the gelling strength or any increase in the apparent molecular weight; this is particularly useful in the field of photography, where it is important, when coating with the emulsion, to have compositions which spread easily so that very thin successive layers can be deposited. Moreover, for the same fluorine contents, the antistatic activity of the modified gelatin is superior to that of the simple mixture of gelatin and fluorinated derivative.

The modified gelatins of the invention contain polyfluorinated groups grafted on to the protein chain. Preferred groups are those of the formula $R_FZ-$, in which Z represents $SO_2$, $CO$ or $-CH(OH)-CH_2-$ and $R_F$ represents a linear or branched, saturated $C_1$ to $C_{15}$ or, preferably, $C_3$ to $C_{10}$ hydrocarbon chain which may contain a heteroatom such as O or a group of heteroatoms such as $-SO_2N-$, all or most of the hydrogen atoms of said hydrocarbon chain being replaced with fluorine atoms, or $R_F$ represents a polyfluorinated phenyl ring, the groups $R_FZ-$ being attached to the nitrogen of the amino groups or to the oxygen of the hydroxyl groups of the protein. Amongst the groups of formula $R_FZ$ in which $R_F$ represents a hydrocarbon chain optionally containing a heteroatom, the groups of formula:

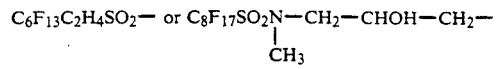

may more particularly be cited.

The starting gelatins can be type A gelatins resulting from the acid hydrolysis of collagen, or type B gelatins resulting from basic hydrolysis, their weight-average molecular weight generally being between 30,000 and 200,000; type B gelatins are preferred for photographic applications. The fluorine content of the modified gelatins of the invention is between 0.02% and 5% by weight and preferably between 0.05 and 2%.

The process of the invention for the preparation of the modified gelatins consists in reacting a polyfluorinated derivative carrying a group capable of reacting with the $NH_2$ or OH groups of a natural gelatin in aqueous solution, forming a covalent bond. The concentration of the aqueous solution of gelatin will generally be between 5% and 20% (w/w); for low-molecular weight gelatins of relatively low viscosity in solution, this concentration may sometimes be even greater; what is important, in fact, is that the medium can be stirred and homogenized during the reaction. The reaction will generally be carried out at a temperature of between 30° C. and 70° C. and at a pH above 7 and even better above 8, but preferably below 10 so as to avoid hydrolysis of the gelatin.

Depending on the particular case, the reagent can be a sulfochloride, a sulfofluoride, a sulfonic anhydride, a carboxylic acid chloride or fluoride, a carboxylic anhydride or an epoxide; if desired, it is introduced into the medium in solution in a watermiscible solvent which does not react under the operating conditions, for example an alcohol such as isopropanol, an ether such as ethylene glycol or diethylene glycol dimethyl or diethyl ethers, or a ketone such as acetone or methyl ethyl ketone; 1 to 30% by weight of fluorinated reagent is introduced, relative to the weight of gelatin, it being preferred to introduce 5 to 20% in the case of reagents containing from 5 to 8 polyfluorinated carbon atoms.

Among the fluorinated reagents derived from sulfonic acids, there may be mentioned the sulfofluorides of the formula $C_nF_{2n+1}SO_2F$, in which n represents an even number from 4 to 10, which are marketed by 3M, the sulfochlorides of the formula $C_nF_{2n+1}C_2H_4SO_2Cl$, in which n represents a number from 2 to 8, which are supplied by Atochem (France), or $CF_3SO_2Cl$ and $(CF_3SO_2)_2O$.

Among the acylated fluorinated reagents, there may be mentioned the acid chlorides $CF_3(CF_2)_nCOCl$ marketed by Alfa or Fluorochem (USA), the fluoride $C_7F_{15}COF$ supplied by Atochem, or the anhydrides $(CF_3(CF_2)_2CO)_2O$ and $(CF_3CO)_2O$. Among the epoxides, there may be mentioned the following product from 3M:

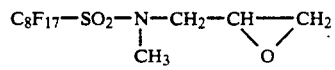

When the reaction is complete, unreacted fluorinated product and its decomposition derivatives, together with the salts, can be removed by passing the reaction medium, diluted if necessary, over anion and cation exchange resins, after filtration or centrifugation if a precipitate has formed. The medium can also be purified by dialysis or by ultrafiltration. Thus the ash content of the gelatin modified in this way, isolated after evaporation of the water, will be less than 1%, which is necessary for certain applications.

Examples of how to carry out the invention are described below. The fluorine contents were determined by conventional methods: mineralization of the samples of modified gelatin according to Schoniger's method and determination of the fluorides formed by colorimetry, potentiometry or ion exchange chromatography. It was shown that the fluorine content was not modified after prolonged dialysis of an aqueous solution of fluorinated gelatin of the invention, demonstrating that the fluorinated chains are indeed grafted on to the protein by the process of the invention.

EXAMPLE 1

400 g of type B gelatin and 3600 ml of water are introduced into a reactor kept at 50° C., which is equipped with a mechanical stirrer. After the gelatin has melted and dissolved, a 5N aqueous solution of NaOH is added until the pH is 8; the pH will be kept at this value throughout the entire reaction by the addition of this same solution.

A solution of 40 g of $C_6F_{13}C_2H_4SO_2Cl$ in 200 ml of isopropanol is then added dropwise over 20 minutes and the stirring and temperature are maintained until the pH no longer changes, i.e. for about 3 hours.

The medium is then acidified to pH 5.9 by the addition of a 5N aqueous solution of nitric acid and kept at 50° C. for 1 hour, with stirring. The small amount of precipitate formed is filtered off and the medium is passed successively through columns, thermostated at 50° C., containing 1 liter (850 g) of the cationic resin IR 120 in the H+ form and containing 1 liter (720 g) of the anionic resin IRA 400 in the OH— form, said resins being of the Amberlite ® type marketed by ROHM and HAAS.

The pH of the aqueous solution eluted is raised to between 5.8 and 6 by the addition of a 5N aqueous solution of NaOH, after which the solution of modified gelatin is solidified by cooling before being chopped up and dried in conventional manner.

The fluorinated gelatin prepared in this way, with a yield of 75% by weight relative to the gelatin used, contains 0.15% by weight of fluorine relative to the weight of the gelatin. The gelling strength of the starting gelatin, measured according to the method of the Gelatin Manufacturers' Institute of America: Standard methods for the sampling and testing of gelatins (temperature 60° C.; concentration 6.67 g/100 ml), was 267 blooms and that of the fluorinated gelatin was 277 blooms, while the viscosity of the gelatin in 6.66% (w/w) aqueous solution, measured at 60° C. according to Afnor standard NF V 59-001 (10/1982)—which was 4.71 mPa.s before treatment—was 7.41 mPa.s for the fluorinated gelatin.

EXAMPLE 2

100 g of type B gelatin, identical to that used in Example 1, and 900 ml of demineralized water are introduced into a reactor kept at 50° C., which is equipped with a stirrer. As previously, the pH is brought from 5.74 to 8 before a solution of 16 g of $C_6F_{13}C_2H_4SO_2Cl$ in 40 ml of isopropanol is added dropwise over 20 minutes; the pH of the medium is kept at 8 for 3 hours; the fluorinated gelatin is isolated according to the method described in the previous Example, except that the reaction medium is diluted to a gelatin concentration of about 6% (weight/weight) before being passed over the columns.

A modified gelatin containing 0.25% of fluorine, which has a gelling strength of 268 blooms and a viscosity of 11.31 mPa.s, is obtained with a yield of 75% under these conditions.

EXAMPLE 3

100 g of type A gelatin are dissolved in 200 ml of water in a reactor kept at 50° C. and the pH of the medium is brought to 9 by the addition of a 5N aqueous solution of NaOH and kept at this value throughout the entire reaction.

A solution of 10 g of $C_6F_{13}C_2H_4SO_2Cl$ in 25 ml of isopropanol is added to the medium over 15 minutes and, after 2 hours, the medium is acidified to pH 5.9 and then purified by passage over ion exchange resins, as in the previous Examples.

Under these conditions, a gelatin with a gelling strength of 247 blooms and a viscosity of 5.18 mPa.s is obtained with a yield of 70% from a gelatin with a gelling strength of 277 blooms and a viscosity at 60° C. of 4.53 mPa.s.

The fluorine content is 0.6%.

EXAMPLE 4

50 g of type B gelatin, identical to that used in Example 1, and 450 ml of demineralized water are introduced into a reactor equipped with a stirrer. The mixture is thermostated at 50° C. The pH is brought to 9 with a 5N solution of sodium hydroxide. 6.5 g of the reagent $C_6F_{13}C_2H_4SO_2Cl$ in the molten state, also kept at 50° C., are added dropwise to the medium over 30 minutes. The pH is then kept at 9 for 1 hour, after which the fluorinated gelatin is isolated as described previously.

The yield is 65%.

A fluorinated gelatin with a gelling strength of 268 blooms, a viscosity of 5.22 mPa.s and a fluorine content of 0.1% is obtained under these conditions.

EXAMPLE 5

150 g of the type B gelatin and 850 ml of demineralized water are introduced into a reactor kept at 60° C.; the pH of the medium is brought to 9.8 by the addition of a 5N aqueous solution of NaOH and, with vigorous stirring, 4.6 g of molten $C_6F_{13}C_2H_4SO_2Cl$ at 60° C. are added dropwise over about 60 minutes. Stirring is continued for one hour after the addition has ended and the reactor heater is then switched off. A 5N aqueous solution of nitric acid is then added to the medium until the pH is 5.8 and the medium is diluted to a gelatin concentration of 8% (w/w) by the addition of water. It is then filtered and chromatographed on columns of ion exchange resins as in Example 1. After evaporation of the water, a fluorinated gelatin with a gelling strength of 259 blooms and a viscosity of 5.20 mPa.s is obtained with a yield of 79% from a gelatin with a gelling strength of 267 blooms and a viscosity of 4.59 mPa.s; its fluorine content is 0.14%.

EXAMPLE 6

A) A solution of 225 g of type B gelatin (267 blooms; 4.59 mPa.s) in 1500 ml of water at 60° C. is brought to pH 9. With vigorous stirring, 29.25 g of molten $C_6F_{13}C_2H_4SO_2Cl$ at 60° C. are then added over 20 minutes, the pH being kept constant. After 40 minutes, during which the temperature and pH are kept constant and stirring is maintained, the medium is treated as in Example 5 and a modified gelatin containing 0.19% of fluorine and having a gelling strength of 247 blooms and a viscosity of 5.76 mPa.s is isolated.

B) By applying the same procedure, except that only 22.5 g of reagent are added, a modified gelatin is obtained which contains 0.13% of fluorine and has a gelling strength of 265 blooms and a viscosity of 5.22 mPa.s.

EXAMPLE 7

In a reactor kept at 60° C., a solution of 100 g of type B gelatin in 900 ml of water is brought to pH 9 by the addition of a 5N aqueous solution of NaOH. 14.97 g of $C_7F_{15}COF$ are then added dropwise over 20 minutes, with stirring: the pH of the medium is kept at 9 by addition of the NaOH solution; 40 minutes after the reaction has ended, the medium is filtered and demineralized on ion exchange columns and the fluorinated gelatin is then isolated as in Example 1. Its fluorine content is 0.73% and it has a gelling strength of 265 blooms and a viscosity of 5.30 mPa.s (starting gelatin: 266 blooms, 4.62 mPa.s).

EXAMPLE 8

50 g of type B gelatin and 450 ml of water are introduced into a reactor kept at 50° C. After the gelatin has melted, the pH of the medium is brought to 8 by the addition of a 5N aqueous solution of NaOH. A solution of 5 g of $CF_3(CF_2)_6COCl$ in 20 ml of acetone is added over 30 minutes, with stirring, the pH of the medium being kept at 8 by the simultaneous addition of an aqueous solution of NaOH.

After stirring for 3 hours, the medium is acidified to pH 5.9 by the addition of a 5N aqueous solution of $HNO_3$, after which it is treated as in Example 1.

A fluorinated gelatin with a gelling strength of 286 blooms (initially 266 blooms) and a viscosity of 5.57 mPa.s (initially 4.62 mPa.s), containing 0.022% of fluorine, is thus obtained with a yield of 82%.

EXAMPLE 9

100 g of type B gelatin and 900 ml of demineralized water are introduced into a reactor at 50° C. and the pH of the medium is brought to 9, this value being kept constant throughout the entire reaction. A solution of 5 g of

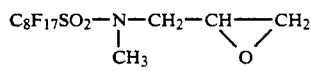

in 40 ml of acetone is added over 15 minutes, with stirring, and the medium is stirred at this temperature for 1 hour.

The medium is then brought to pH 6 by the addition of a 5N aqueous solution of $HNO_3$ and treated as previously. This gives a fluorinated gelatin containing 0.24% of fluorine and having a gelling strength of 283 blooms and a viscosity of 4.88 mPa.s. (starting gelatin: 266 blooms, 4.62 mPa.s.).

EXAMPLE 10

100 g of the gelatin used in Example 9 and 900 ml of water are introduced into a reactor kept at 60° C.; the initial pH of 5.6 is brought to 9.5 by the addition of a 5N aqueous solution of NaOH. 10.96 g of $C_6F_5SO_2Cl$ are then added dropwise to the stirred medium, the pH being kept at 9.5. The fluorinated gelatin is isolated according to the process described in Example 1 after the solution has been acidified to pH 4.86.

This gelatin, containing 0.17% of fluorine, has a gelling strength of 227 blooms and a viscosity of 6.92 mPa.s.

EXAMPLE 11

A solution of 6.05 g of trifluoromethanesulfonyl chloride in 40 ml of isopropanol is added dropwise over 20 minutes to a 10% (w/w) aqueous solution of type B gelatin (used in Example 9) kept at 60° C. and pH 10. After stirring for 40 minutes, the medium is acidified to pH 5.8 and treated as in the previous Examples.

Fluorinated gelatin containing 0.10% of fluorine and having a gelling strength of 230 blooms and a viscosity of 5.2 mPa.s is thus isolated with a yield of 82%.

EXAMPLE 12

100 g of type B gelatin used in Example 9 and 900 ml of demineralized water are introduced into a reactor at 60° C., which is equipped with a stirrer, and the pH of the medium is brought to 10 by the addition of a 5N aqueous solution of NaOH. 18.07 g of $C_8F_{17}SO_2F$ are then added dropwise over 20 minutes. 1 hour after the addition has ended, the pH of the medium is brought to 5.9 and the usual treatment is carried out.

A modified gelatin containing 0.13% of fluorine and having a gelling strength of 242 blooms and a viscosity of 4.1 mPa.s is thus isolated with a yield of 75%.

EXAMPLE 13

10.15 g of trifluoromethanesulfonic anhydride are added over 20 minutes to a solution of 100 g of type B gelatin in 900 ml of water at 60° C. and pH 9. After 40 minutes, the medium is acidified to pH 5.8 and treated as in the previous Examples. This gives a modified gelatin containing 0.02% of fluorine and having a gelling strength of 268 blooms and a viscosity of 4.41 mPa.s. (starting gelatin: 267 blooms, 4.41 mPa.s.).

The viscosities of solutions of fluorinated gelatins according to the invention were compared with that of a mixture of gelatin and the hydrolyzed initial fluorinated derivative. The results of the viscosity measurements are shown in Table I.

TABLE I

| Gelatin | Viscosity mPa.s |
| --- | --- |
| Starting gelatin | 4.71 |
| Example 1 | 7.41 |
| Example 4 | 5.22 |
| Mixture with $C_6F_{13}C_2H_4SO_3H$, containing 0.1% of F | 4.09 |

The antistatic properties were assessed with an apparatus marketed by Eltex Electrostatique-Asniéres, France, under the reference EMF 20, which makes it possible to measure the discharge time of films which have first been subjected to the action of an intense electric field; the measurements were made at 23° C. and a relative humidity of 40%; Table II shows the times in seconds which are required for 50%, 70% or 90% of the charge on the gelatin film to disappear, depending on its initial charge.

TABLE II

| Gelatin | Initial charge on the film kV | Discharge time in s for | | |
|---|---|---|---|---|
| | | 50% | 70% | 90% |
| Starting gelatin | 1.8 | 1.9 | 3.1 | 20.9 |
| Example 1 | 1.9 | 1.4 | 2.2 | 7.9 |
| Example 6 A | 1.7 | 0.9 | 1.6 | — |
| Example 6 B | 2.0 | 1.5 | 2.6 | 7.9 |

We claim:

1. A modified gelatin bearing inert polyfluorinated substituents covalently bonded to the protein chain by a process consisting essentially of reacting gelatin with a monofunctional polyfluorinated reagent containing only one group capable of reacting with the OH or $NH_2$ groups of the protein chain.

2. A gelatin according to claim 1, carrying groups of the formula $R_FZ-$, in which Z represents $SO_2$, CO or $-CH(OH)-CH_2-$, and $R_F$ represents a $C_1$ to $C_{15}$ hydrocarbon chain comprising polyfluorinated groups which may be interrupted by a heteroatom or a group of heteroatoms, or a polyfluorinated phenyl ring.

3. A gelatin according to claim 2, wherein Z represents $SO_2$.

4. A gelatin according to claim 2, wherein Z represents CO.

5. A gelatin according to claim 1, wherein $R_F$ is a $C_3$ to $C_{10}$ polyfluoroalkyl group.

6. A gelatin according to claim 2, wherein the group $R_F-Z-$ is $C_6F_{13}C_2H_4SO_2-$.

7. A gelatin according to claim 2, wherein $R_FZ-$ is the

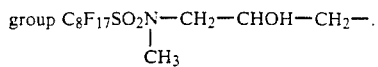

8. A process for the preparation of a gelatin according to claim 2, which comprises reacting a polyfluorinated derivative containing a group capable of reacting with the OH or $NH_2$ groups of the gelatin in aqueous solution.

9. A process according to claim 8, wherein the reaction medium is at a pH of between 7 and 10 and a temperature of between 30° C. and 70° C.

10. A process according to claim 8, wherein the reagent is added in solution in a water-miscible inert solvent.

11. A process according to claim 8 for the preparation of a gelatin in which Z is an $SO_2$ group, wherein a sulfonyl chloride or fluoride or a sulfonic anhydride is reacted.

12. A process according to claim 8 for the preparation of a gelatin in which Z is a CO group, wherein a carboxylic acid chloride or fluoride or a carboxylic anhydride is reacted.

13. A process according to claim 8 for the preparation of a gelatin in which Z is a $CHOH-CH_2$ group, wherein an epoxide is reacted.

* * * * *